June 30, 1970  J. E. LAKE  3,518,020
SPLIT SEAL RING ASSEMBLY FOR COMPRESSORS
Filed April 4, 1968  2 Sheets-Sheet 1

Inventor:
John E. Lake,
by (signature)
His Attorney.

June 30, 1970    J. E. LAKE    3,518,020
SPLIT SEAL RING ASSEMBLY FOR COMPRESSORS
Filed April 4, 1968    2 Sheets-Sheet 2
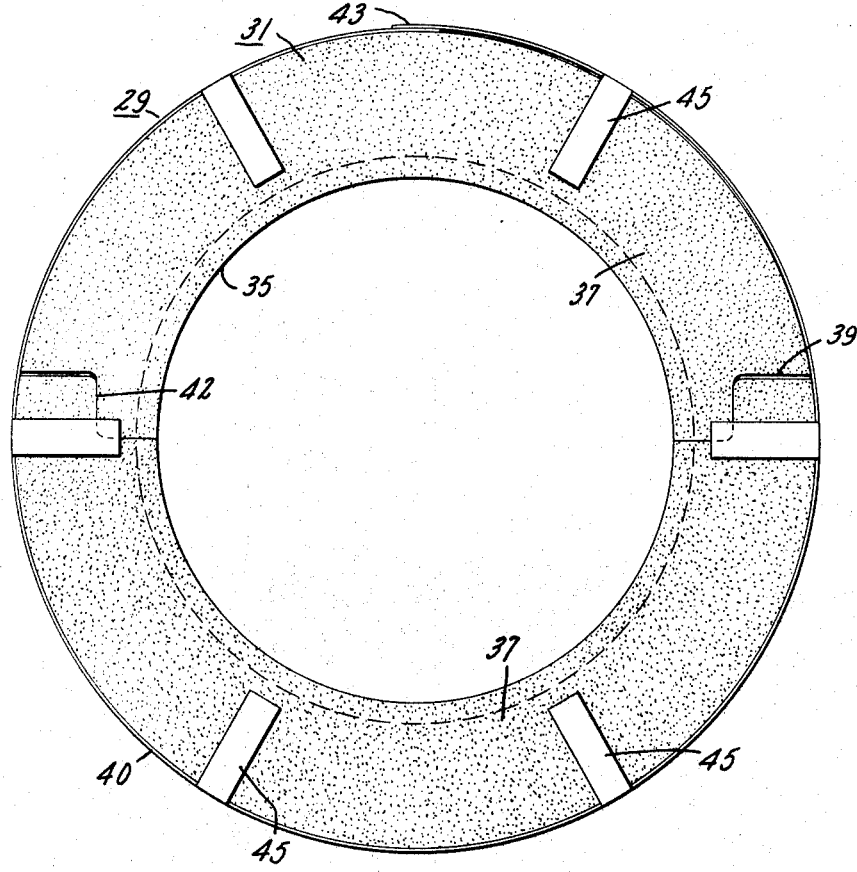
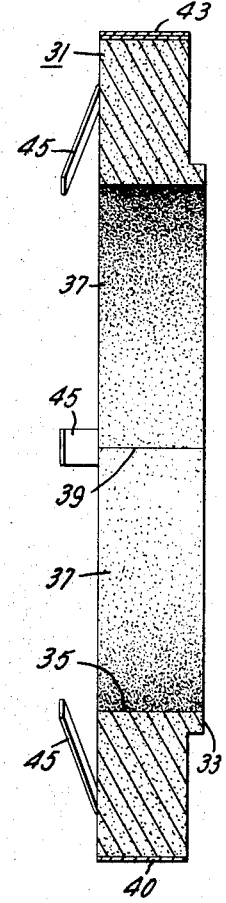
Inventor:
John E. Lake,
by Paul A. Frank
His Attorney.

United States Patent Office 3,518,020
Patented June 30, 1970

3,518,020
SPLIT SEAL RING ASSEMBLY FOR COMPRESSORS
John E. Lake, Schenectady, N.Y., assignor to General Electric Company, a corporation of New York
Filed Apr. 4, 1968, Ser. No. 718,828
Int. Cl. F04d 17/12
U.S. Cl. 415—111                                     4 Claims

ABSTRACT OF THE DISCLOSURE

A gas compressor comprising a plurality of separate compressor stages is provided with interstage seals. Each seal comprises an impregnated carbon ring which is split diametrically for assembly about the compressor rotor shaft between adjacent stages. The ring portions are connected by a frictionally interfitting step joint and are further retained by thin stressed metal band which surrounds the ring periphery. The band has cantilevered spring fingers extending therefrom which act against a fixed surface to hold the ring in position and prevent it from rotating with the shaft. The ring dimensions are so chosen that a gas film is maintained between the ring seals and the rotor shaft.

---

This invention relates to gas seals and, particularly, to floating, controlled gap seals for high speed, gas compressors. The invention herein described was made in the course of or under a contract with the United States Department of the Air Force.

High speed gas compressors are often provided with a plurality of compressor stages. In such machines, especially in small multi-stage machines of the regenerative type, there occur pressure differentials between adjacent stages. Therefore, in order to maintain satisfactory compressor efficiency, seals are required to control fluid leakage between the compressor stages.

While it has been heretofore known to use seals for the rotor shaft of these machines which are self-centering or floating, that is, seals which adjust position to accommodate changes in position of the rotor, a liquid lubricant is ordinarily utilized to lubricate the seal. To avoid having to provide a liquid lubricant, especially in cryogenic applications where the liquid may have deleterious effects on the efficiency of operation, gas seals have been used wherein a gas is utilized as the lubricant. However, prior gas seals have generally been stationary arrangements which require larger annular clearances, resulting in an undesirable increase in leakage flow between stages. I am aware of no floating seals for such application which utilize a gas system for lubricating surfaces. A floating seal utilizing a gas lubricant would be most effective if the seal was caused to assume a generally concentric position about the rotor shaft, thereby producing a uniform controlled gap between the seal surface and the rotor shaft and minimizing contact therebetween. In a device such as small high speed gas compressors, the need for close running clearances makes it highly desirable to provide an interstage seal of the floating, controlled-gap type which can use the working fluid of the compressors as the lubricant.

An additional problem develops with respect to seal design for small higher speed air compressors which utilize gas bearings to support the compressor rotor shaft. In such machines, the compressor rotor shaft, the impellers mounted thereon and the compressor stator must be precisely positioned so that the gas bearings may operate effectively. In one known arrangement, the rotor shaft, the impellers, and the stator are pre-assembled before introduction into the compressor housing to ensure close tolerances. Thus, it may be necessary to include interstage seals which may be assembled about the rotor shaft during the rotor-stator assembly operation without any loss in ultimate sealing effectiveness.

It is, therefore, an object of this invention to provide a novel interstage seal for a gas compressor.

It is another object of this invention to provide a novel interstage seal for a gas compressor which minimizes interstage leakage flow even when attitude changes in the position of the compressor rotor occur.

It is another object of this invention to provide for a gas compressor, an interstage seal using the compressor gas as a lubricant which does not detrimentally affect compressor operation.

It is a further object of this invention to provide an interstage seal for a gas compressor which can be easily assembled and positioned on the compressor rotor shaft.

In accordance with my invention and one form thereof, I provide interstage seals for a gas compressor comprising a plurality of compressor stages, each seal comprising a ring split diametrically for assembly about the compressor rotor between adjacent stages. The two ring halves are connected by step joints and further retained by a thin-stressed metal band which surrounds the ring periphery. The ring dimensions are so chosen that a gas film is maintained between the seal rings and the rotor shaft. Thus, I provide a floating, controlled-gap seal which utilizes the working fluid of the gas compressor as a lubricant and which effectively controls gas flow caused by pressure differences between stages.

Other objects and advantages of my invention may better be understood by reference to the following detailed description when taken in conjunction with the accompanying drawings in which:

FIG. 2 is a plan view of an interstage seal of the present invention; and

FIG. 3 is a side view of an interstage seal.

Figure 1:
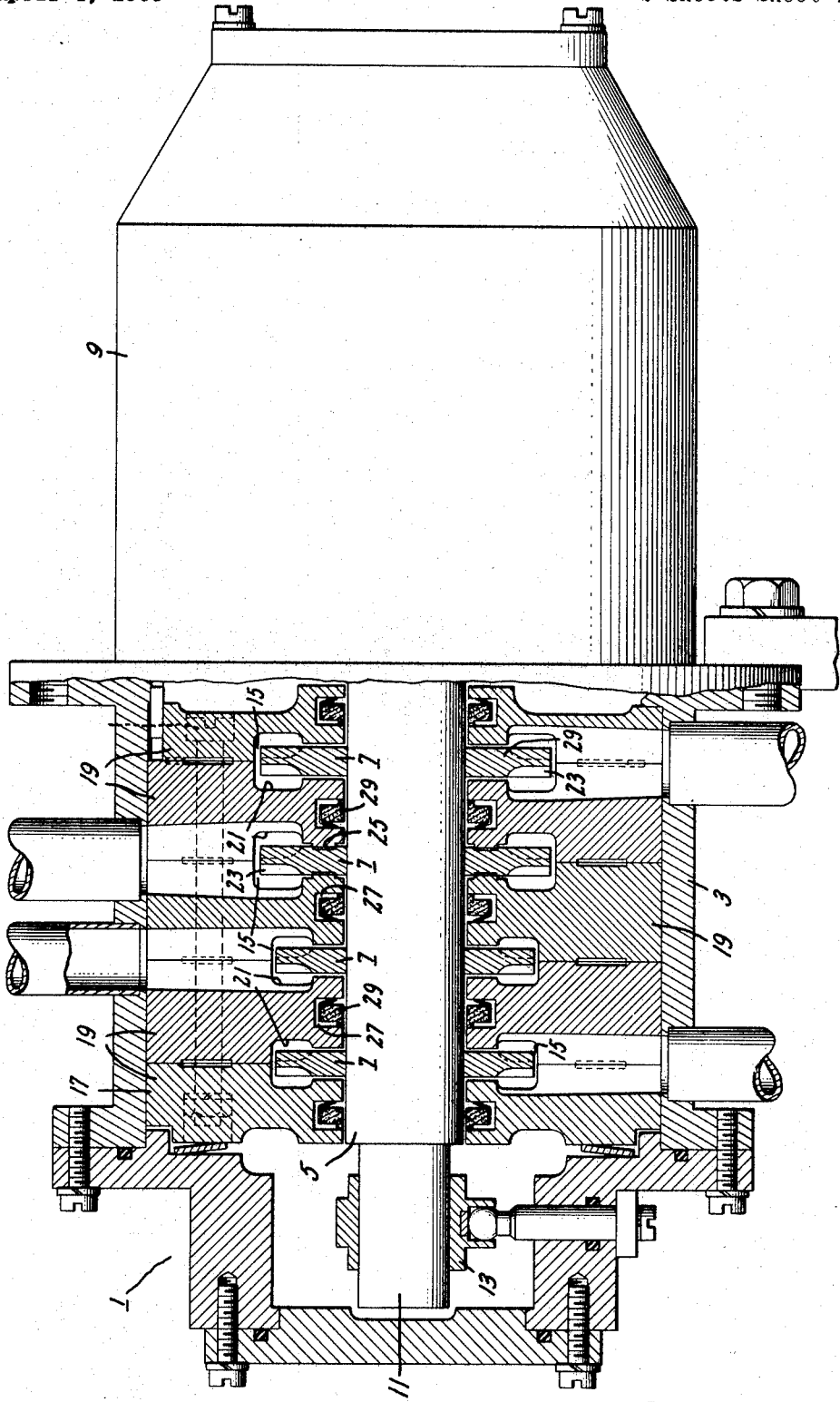
FIG. 1 is a cross-section view of a multi-stage compressor including the interstage seals of the present invention.

There is shown in FIG. 1 a multi-stage, high speed gas compressor 1 of the dynamic type for application, for example, as a component in a closed cycle cryogenic refrigerator. The particular compressor shown has four stages of the regenerative type although no special significance is placed in the number of stages chosen. The compressor 1 comprises an external housing 3 wherein is mounted a compressor rotor shaft 5 including a plurality of spaced impellers 7 mounted thereon. The rotor shaft 5 is driven by a suitable motor 9, the structure of which forms no part to the present invention and may take any suitable form. The extremities 11, of the rotor shaft 5, are seated in suitable bearings 13 within the housing 3. In the particular embodiment shown the bearings 13 take the form of journal bearings located at each end of the rotor, but regarding the present invention, no significance is placed on the type of bearings used.

Each impeller 7 is disposed in a chamber 15 formed in a surrounding stator assembly 17. The stator assembly 17 comprises a series of individual stator members 19. Each compressor stator member 19 comprises a disk-like member which is split along its diameter to permit assembly about the rotor shaft 5 and which includes cutout portions 21, which cooperate with the cutout portions 21 of adjacent stator members 19 to form an individual chamber 15. Each chamber 15 and the impeller 7 associated therewith combine to comprise a separate compressor stage. Thus, in the particular embodiment shown, four separate compressor stages are formed by the stator assembly 17 comprising five stator members 19. For ready reference, the compressor stages are designated I, II, III and IV. Each impeller 7 rotates in the associated chamber 15, which is larger than the impeller cross-section so that fluid is free to enter or leave the impeller blades 23, around nearly the entire periphery thereof. Suitable inlet and outlet ports (not shown) are provided for each stage which communicate with one chamber 15 for connection with other stages in a desired manner.

A thrust bearing assembly 25 is provided to absorb the axial thrust on the rotor shaft. In the embodiment shown, the thrust bearing 25 is integrated with compressor stage II. This thrust bearing forms the subject matter of copending application S.N. 718,830, filed Apr. 4, 1968, assigned to the same assignee as the present invention. It is to be understood, however, that any suitable thrust bearing arrangement may be provided.

As has been stated previously, during compressor operation pressure differentials are built up between the various compressor stages. Adequate seals must, therefore, be provided at locations between the stages to restrict fluid flow caused by these pressure differentials. As is shown in FIG. 1, each stator member 19 includes an annular space 27 surrounding the rotor shaft 5 at a position between a pair of adjacent stages. Disposed within each annular space 27 and about the rotor shaft 5 is a novel interstage seal 29 constructed in accordance with the present invention.

Because of the decidedly laminar character of the fluid flow along the shaft between stages in this compressor an annular capillary seal 29 was selected which has been found to perform better than a multitooth labyrinth seal. Leakage flow thru the capillary seal is proportional to the cube of the radial clearance, so the provision of a close running clearance around the rotor shaft 5 is especially important. The interstage seal selected is a self-centering floating type (moves radially as shaft position changes) wherein a controlled-gap is effected between the seal 29 and the rotor shaft 5. With this seal, it has been possible to reduce the annular clearance at the rotor shaft 5 to less than one-third the minimum practical if a hard fixed-position seal, such as the internal bore of the compressor stator members 19 is used.

Referring now specifically to the drawings, particularly FIGS. 2 and 3, there is shown the novel interstage seal 29 of the present invention. Each interstage seal 29 comprises a seal ring 31, which may be comprised of an impregnated carbon material. The seal ring 31 is of generally circular configuration and includes a lapped face 33 and bore 35 which form the sealing surfaces. In order to accommodate the preassembly of the rotor-stator arrangement, the seal ring 31 is split diametrically and the constituent parts 37 are connected with step joint 39 at the extremities thereof after first being assembled over the rotor shaft 5 between the impellers 7. The two portions 37 are further held in position with a thin stressed metal band 40 welded at a circumferential point 43. The step joint 39 comprised of interfitting S-shaped surfaces 42 at the extremities of each ring portion 37. The surfaces 42 are frictionally interfitted to help retain the ring portions 37 together during assembly around the shaft.

The sealing dimensions are so selected that a hydrodynamic gas film is maintained between the rotor shaft and seal 29 during rotor rotation. The film is provided by the working fluid of the compressor between the seal surface 35 and rotor shaft 5 and prevents radial contact between the rotor shaft 5 and the seal bore 35. As the rotor attitude changes, the seal 29 moves radially to follow it due to the gas forces thereon and, thereby provides the floating or self-centering feature desired. Because the hydrodynamic gas film maintains a generally constant pressure about the rotor shaft 5, the seal 29 obtains an attitude which provides for a controlled gap between the seal bore 35 and the rotor shaft 5.

In operation at high speeds the fluid film resulting from rotor rotation will tend to center seal 29 around rotor shaft 5, as has been described. During start and stop transients, however, momentary contact between seal 29 and rotor shaft 5 may occur to relocate seal 29 as rotor position changes. These radial centering actions will be resisted by frictional forces resulting from an axial load on seals 29 due to the gas pressure differential. For satisfactory operation the seal frictional forces must be sufficiently low to permit seal 29 to seek a reasonably low eccentricity with respect to rotor shaft 5. Certainly, continuous rubbing between rotor shaft 5 and seal 29 could not be tolerated at high speeds. On the other hand, the frictional forces tending to fix seal position must be high enough to prevent rotation of the seals due to the drag of the fluid film. Furthermore, at low speeds, where the pressure difference is negligible, there must be provided sufficient axial force to maintain seal position.

To effectuate this, each interstage seal 29 is provided with a source of axial force comprising spring means in the form of cantilevered spring fingers 45 which are integral with outer metal band 40 and which extend to contact a fixed interior portion of the wall forming annular space 27 in each stator member 19. Spring fingers 45 are compressed and provided the restraining forces which, at low speeds, maintain seal position, and, at high speeds, augment the frictional forces resulting from the differential pressure across each seal 29 to maintain position. The combined forces at high speeds, however, remain sufficiently low to permit seal 29 to seek a reasonably low eccentricity with respect to rotor shafts. The spring material for outer band 40 is so chosen that at installation in the stator space 27 the maximum spring bending stress in fingers 45 is greater than the yield point of the material. Thus, the installed axial spring operating loads are known, are essentially equal in each finger, and can be maintained in the system. Additionally, spring fingers 45 serve to provide some degree of axial sealing forces at the seal face 33 which enhances the quality of the seal.

Sudden radial shifts of rotating shaft 5 in operation may cause momentary radial contact between shaft 5 and seal bore 35 but, it can now be seen, the friction and gas forces act to reposition the seal assembly so that a continual contact with moving rotor shaft 5 is eliminated and that the controlled gap is maintained.

As has been stated previously, seal ring 31 is split diametrically so that it may be assembled about rotor shaft 5 after impellers 7 have already been positioned thereon. Seal portions 37 are connected by step joints 39 and there is a slight springing action or pressure between the two ring portions 37 at the step surfaces 42 to allow ring 31 to be retained on the rotor shaft 5 during assembly. Of course, the main retaining force comes from metal band 40 which is welded while under tension at a circumferential point 43 about ring 31.

Although I have described the interstage seal ring as comprising a material such as impregnated carbon, it is to be understood that other conventional sealing materials or equivalents can be used in accordance with the present invention.

While the present invention has been described with specificity, it is the aim of the appendant claims to cover all such equivalents and variations as come within the true spirit and scope of the foregoing disclosure.

What I claim as new and desired to secure by Letters Patent of the United States is:

1. For use in a high speed gas compressor including a rotor mounted on a shaft, a stator having a central bore therein for receiving said rotor, a plurality of compressor stages spaced along said rotor, said stator further including annular spaces between adjacent compressor stages and communicating with said stator bore, each of said annular spaces bounded by a respective pair of sidewalls generally perpendicular to the axis of said shaft, a seal for mounting in said annular space for limiting fluid flow between adjacent compressor stages comprising
- a seal ring mounted in said annular space and including a central bore having a diameter slightly larger than the diameter of the shaft of said rotor, an annular metal band disposed about the periphery of said seal ring, a plurality of cantilevered spring fingers integral with said metal band and spaced thereabout, said spring fingers abutting one of said sidewalls of said stator,
- said spring fingers having a spring stress in compression above the yield point thereof when said spring fingers are positioned in said annular space, whereby a predetermined compression force is produced on the walls of said annular space thereby producing a predetermined frictional force on said seal in a plane perpendicular to the axis of said shaft resisting movement in response to radially directed fluid pressures on said seal ring.

2. The combination of claim 1 in which an opposed surface of said seal abuts the other of said walls of said annular space.

3. The combination of claim 1 in which
said predetermined frictional force is sufficiently great to prevent said ring from contacting said shaft and less than the radially directed fluid pressure of force created by rotation of said shaft in said bore to permit movement of said seal in response to a change in attitude of said shaft.

4. The combination of claim 1 in which said seal ring is diametrically split into constituent portions and said metal band retains said constituent portions in abutting gas tight relationship.

References Cited

UNITED STATES PATENTS

| | | | |
|---|---|---|---|
| 980,282 | 1/1911 | Junggren | 277—72 |
| 2,135,251 | 11/1938 | Farmer | 277—70 |
| 2,396,319 | 3/1946 | Edwards et al. | 277—83 |
| 2,426,645 | 9/1947 | Riede | 103—96 |
| 3,001,806 | 9/1961 | Macks | 277—27 |
| 3,168,871 | 2/1965 | Sieghartner | 103—108 |

FOREIGN PATENTS 22,360  1903  Great Britain.

SAMUEL FEINBERG, Primary Examiner

U.S. Cl. X.R.

277—27, 83, 154, 175